US011486731B1

(12) United States Patent
Bakker et al.

(10) Patent No.: US 11,486,731 B1
(45) Date of Patent: Nov. 1, 2022

(54) METHOD FOR REGISTERING AND LOCATING WATER RESOURCES

(71) Applicants: Cody J. Bakker, Spring Creek, NV (US); Thomas T. Traphagan, Ravendale, CA (US)

(72) Inventors: Cody J. Bakker, Spring Creek, NV (US); Thomas T. Traphagan, Ravendale, CA (US)

( * ) Notice: Subject to any disclaimer, the term of this patent is extended or adjusted under 35 U.S.C. 154(b) by 0 days.

(21) Appl. No.: 17/348,612

(22) Filed: Jun. 15, 2021

Related U.S. Application Data

(63) Continuation of application No. 16/396,685, filed on Apr. 27, 2019, now Pat. No. 11,035,694.

(51) Int. Cl.
| | |
|---|---|
| *G01D 4/00* | (2006.01) |
| *G01D 4/14* | (2006.01) |
| *G06Q 50/06* | (2012.01) |
| *G01F 15/075* | (2006.01) |
| *G06F 21/31* | (2013.01) |
| *H04W 4/021* | (2018.01) |
| *G01F 15/063* | (2022.01) |

(52) U.S. Cl.
CPC ............ *G01D 4/006* (2013.01); *G01D 4/008* (2013.01); *G01D 4/14* (2013.01); *G01F 15/063* (2013.01); *G01F 15/0755* (2013.01); *G06F 21/31* (2013.01); *G06Q 50/06* (2013.01); *H04W 4/021* (2013.01)

(58) Field of Classification Search
None
See application file for complete search history.

(56) References Cited

U.S. PATENT DOCUMENTS

2005/0278441 A1* 12/2005 Bond .................... G06F 9/5027
709/223

\* cited by examiner

*Primary Examiner* — Carlos Garcia
(74) *Attorney, Agent, or Firm* — Malone IP Law; Steven J. Malone (57) ABSTRACT

A method of registering and locating a water resource includes incentivizing an owner for registering the water resource and associating owner contact information and coordinate location data of the water resource to the water resource. An online database stores the coordinate location data of the water resource, the owner of the water resource, and the owner contact information received from the first electronic device. A second electronic device displays on an electronic map the coordinate location data of the water resource within an area of the electronic map. The user of the second electronic device is informed, after selection of the water resource, the name of the owner of the water resource, the owner contact information of the water resource, the coordinate location data of the water resource, and an account of the owner is credited if the water resource is used.

17 Claims, 7 Drawing Sheets

METHOD FOR REGISTERING AND LOCATING WATER RESOURCES

RELATED APPLICATIONS

This application is a continuation of granted U.S. application Ser. No. 16/396,685 filed on Apr. 27, 2019.

FIELD OF THE INVENTION

The disclosed novelty relates generally to the field of in-ground water resources and more specifically to registration and identification of well pumps, water taps, ponds, lakes, rivers, and irrigation water taps.

SUMMARY

A method of locating a water resource includes taking a first electronic device within a predetermined radius of the water resource; running a first non-transitory computer program product in a memory of the first electronic device that names the water resource, associates an owner of the water resource to the water resource, associates owner contact information with the water resource, and stores coordinate location data of the water resource, the owner of the water resource, and the owner contact information in an online database; loading, using a second electronic device running a second non-transitory computer program product running in a memory of the second electronic device, the coordinate location data of the water resource within an area of an electronic map displayed on the second electronic device; and informing a user of the second electronic device, after selection of the water resource, the name of the owner of the water resource and the owner contact information of the water resource. Water resources as used herein include bodies of water such as lakes, streams, reservoirs, springs, underground water, wells, cisterns, irrigation water, domestic water sources, water taps, etc.

The predetermined distance may be between 1 inch and 100 feet. The first electronic device or the second electronic device may be a smart phone, tablet, Ipad, laptop, GPS (global positioning system) tracking device, GPS (global positioning system) locating device, or computer. The user of the second electronic device may need to be authenticated before accessing the water resource information. The method may further comprise assigning privileges to the user of the second electronic device based on the authenticating. The method may further comprise navigating the user to the water resource using a navigational map displayed on the second electronic device. The method may further comprise instructing the user how to find and access the water resource. The instructing may include access codes to one or more gates enclosing the water resource. The instructing may include instructions of how to turn ON and OFF the water resource. The instructing may include restrictions of use of the water resource. The instructing may include flow rate capacity of the water resource. The instructing may include one or more of: text information, video information, pre-recorded information, picture information, messaging information, or a combination thereof. The instructing may include access connection type of the water resource. The method may further comprise allowing the user of the second electronic device to input an amount of water taken from the water resource. The method may further comprise a start and stop timer of the second electronic device tracks time of water usage of the water resource. The amount of water taken may be based on the time of water usage timer. The method may further comprise a reporting system for reporting activities associated with the water resource. The activities may include one or more of: emailing, texting, authorizing, authenticating, or reconciling use of the water resource. The activities may include notifying the owner of use or desired use of the water resource. The notifying of the owner may include soliciting authorization of the owner to use the water resource.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
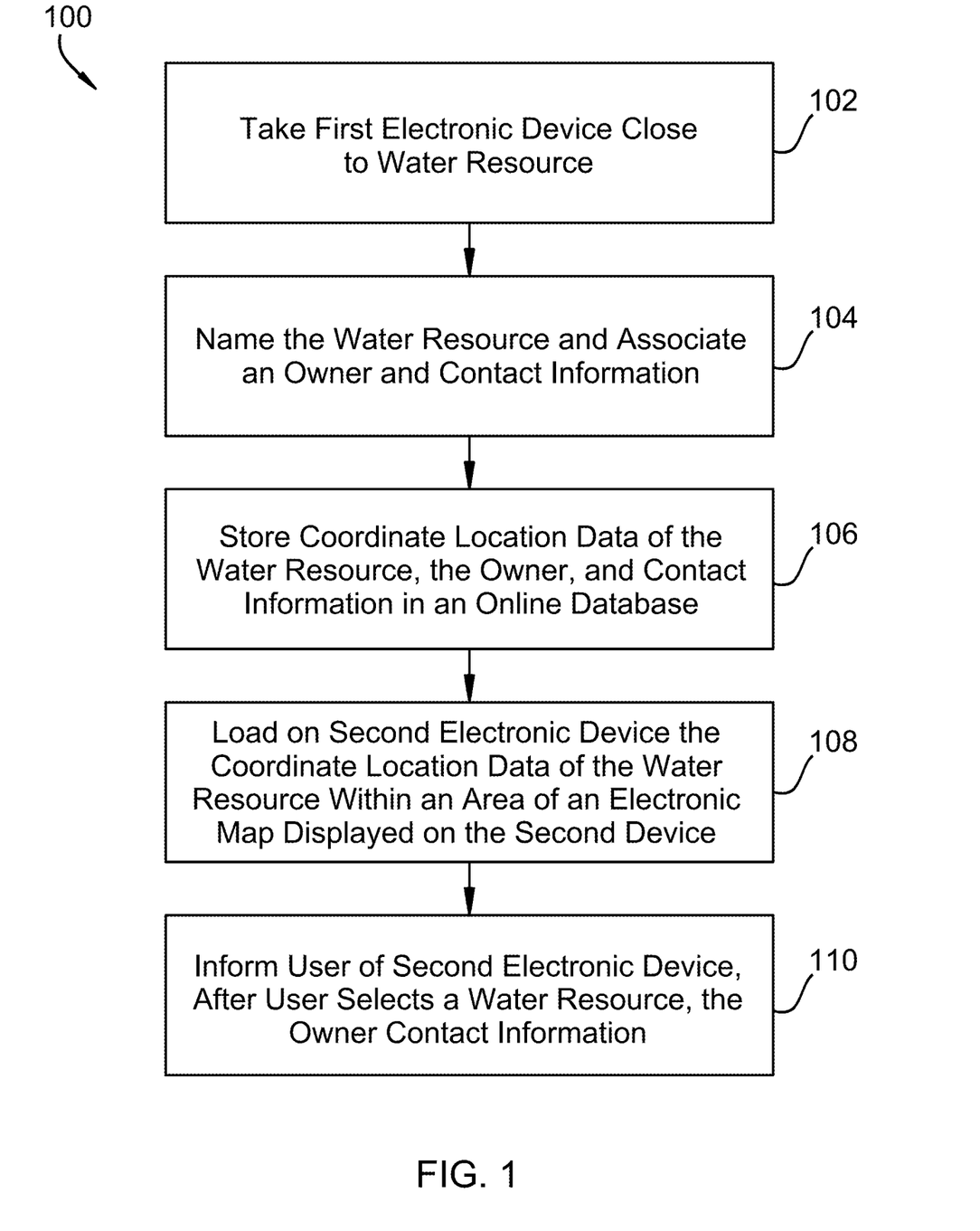
FIG. 1 is a method flow diagram in accordance with an embodiment of the invention.

FIG. 1 shows a method flow diagram 100 of registering a water resource and locating the registered water resource. An electronic device, such as a smart phone, is physically taken within a predetermined radius of a water resource 102. Once the electronic device is close to the water resource, a register function may be started by a user of the electronic device selecting a "register my water resource button". A software module may then be activated which allows the user to name the water resource and associate an owner and contact information of the owner of the water resource 104. The software module in the electronic device may then store coordinate location data of the water resource and the owner information in an online database or cloud database network 106. Now that the water resource is registered with an online service, a second electronic device may load the coordinate location data of the registered water resource and display the water resource within an area of an electronic map displayed on the second electronic device 108. After the user of the second electronic device selects the registered water resource on his electronic map, the user is informed of the owner contact information for the water resource 110.

Figure 2:
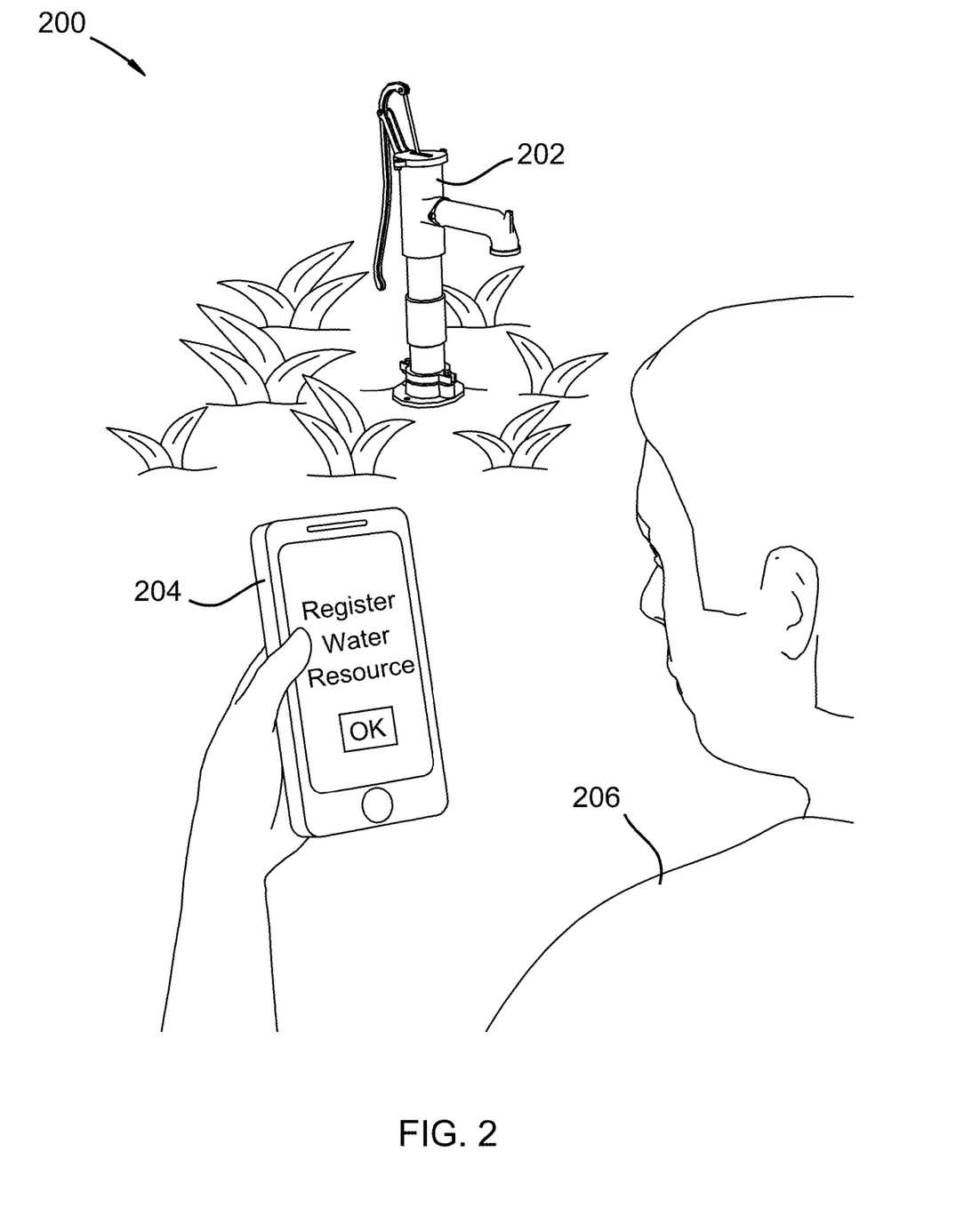
FIG. 2 is a perspective view of a water resource registration in accordance with an embodiment of the present invention.

FIG. 2 shows a water resource registration process 200 including a water resource 202, a first electronic device 204 and a user 206 of the first electronic device. An electronic device 204, such as a smart phone, is physically taken within a predetermined radius of a water resource 202. Once the electronic device is close to the water resource, a register function may be started by a user of the electronic device selecting a "register water resource button". A software module may then be activated which allows the user to name the water resource and associate an owner and contact information of the owner of the water resource. The software module in the electronic device may then store coordinate location data of the water resource and the owner information in an online database or cloud database network.

Figure 3:
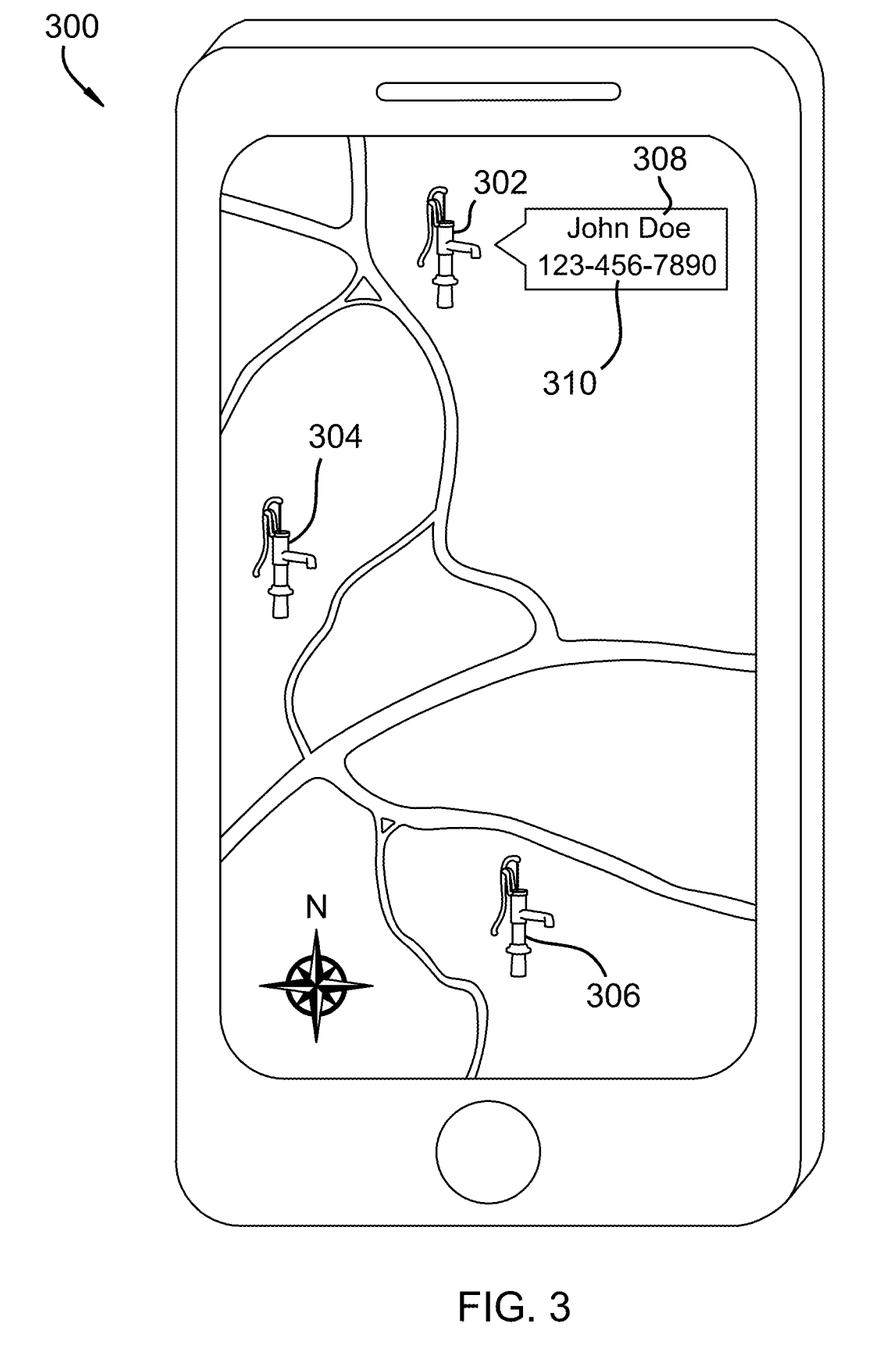
FIG. 3 is a front perspective view of a map device in accordance with an embodiment of the invention.

FIG. 3 shows a second electronic device 300 with an electronic map. The electronic map includes water resources 302, 304, 306 that have been previously registered with an online database. Second electronic device 300 may load the coordinate location data of the registered water resource and display the water resource within an area of an electronic map displayed on the second electronic device. After the user of the second electronic device selects the registered water resource on his electronic map 308/310, the user is informed of the owner contact information for the water resource 308/310.

Figure 4:
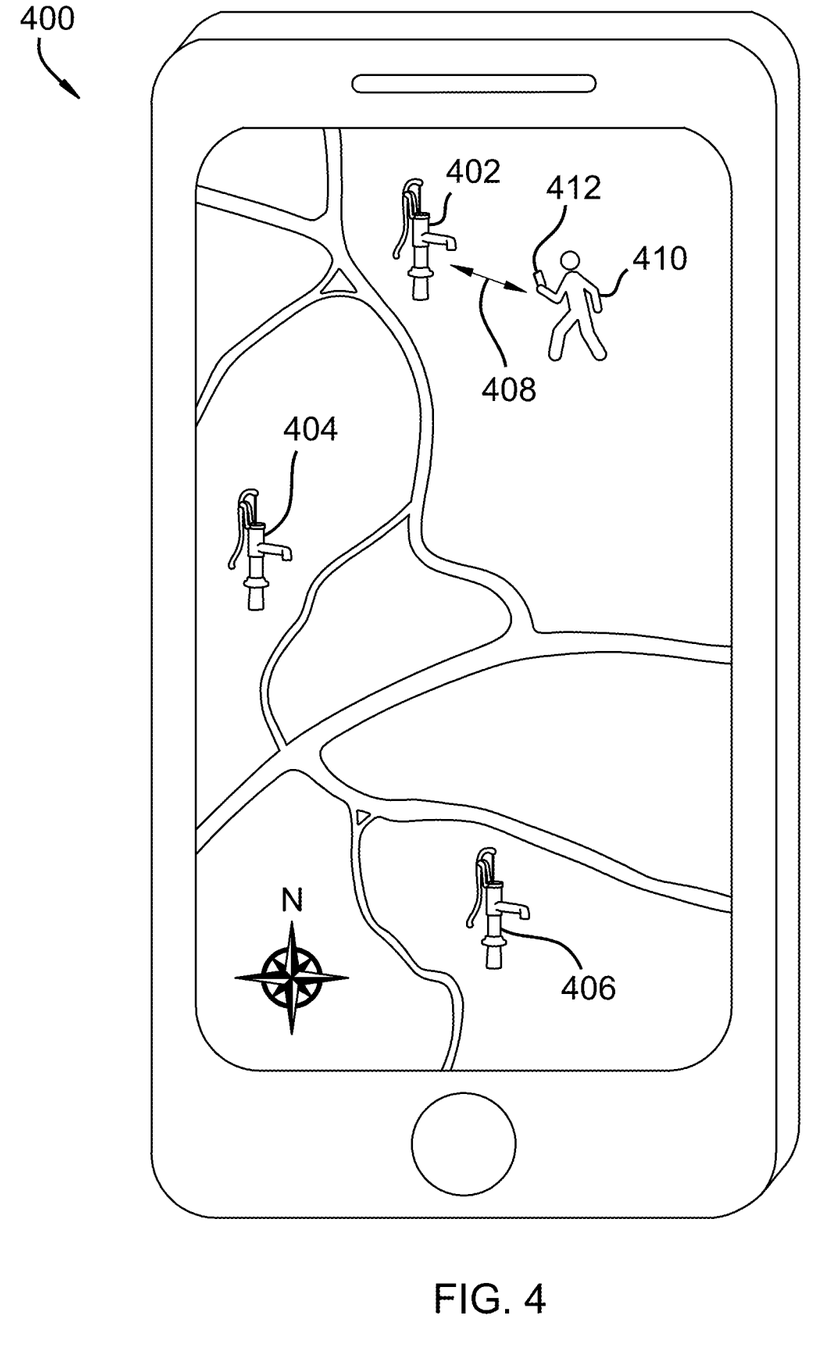
FIG. 4 is a front perspective view of a map device in accordance with an embodiment of the invention.

FIG. 4 shows a water resource location and tracking process on first electronic device 400 including water resources 402, 404, 406, a second electronic device 412 and a user 410 of the second electronic device. First electronic device 400 belonging to the owner of water resource 402 may be notified of user 410 approaching water resource 402 when water resource user 410 comes within a predetermined radius 408. This distance may be between 1 and 1000 feet. The application software running on device 412 may report to an online database the location of user 410 in relation to water resource 402 and provide notification to an owner of water resource 402 and show on a map of first electronic device 400 the location of user 410 approaching the owners' water resource 402. Application software running on device 400 and device 412 may be communication compatible allowing in app communication such as texting and calling between an owner of water resource 402 and a user 412 of water resource 402.

Figure 5:
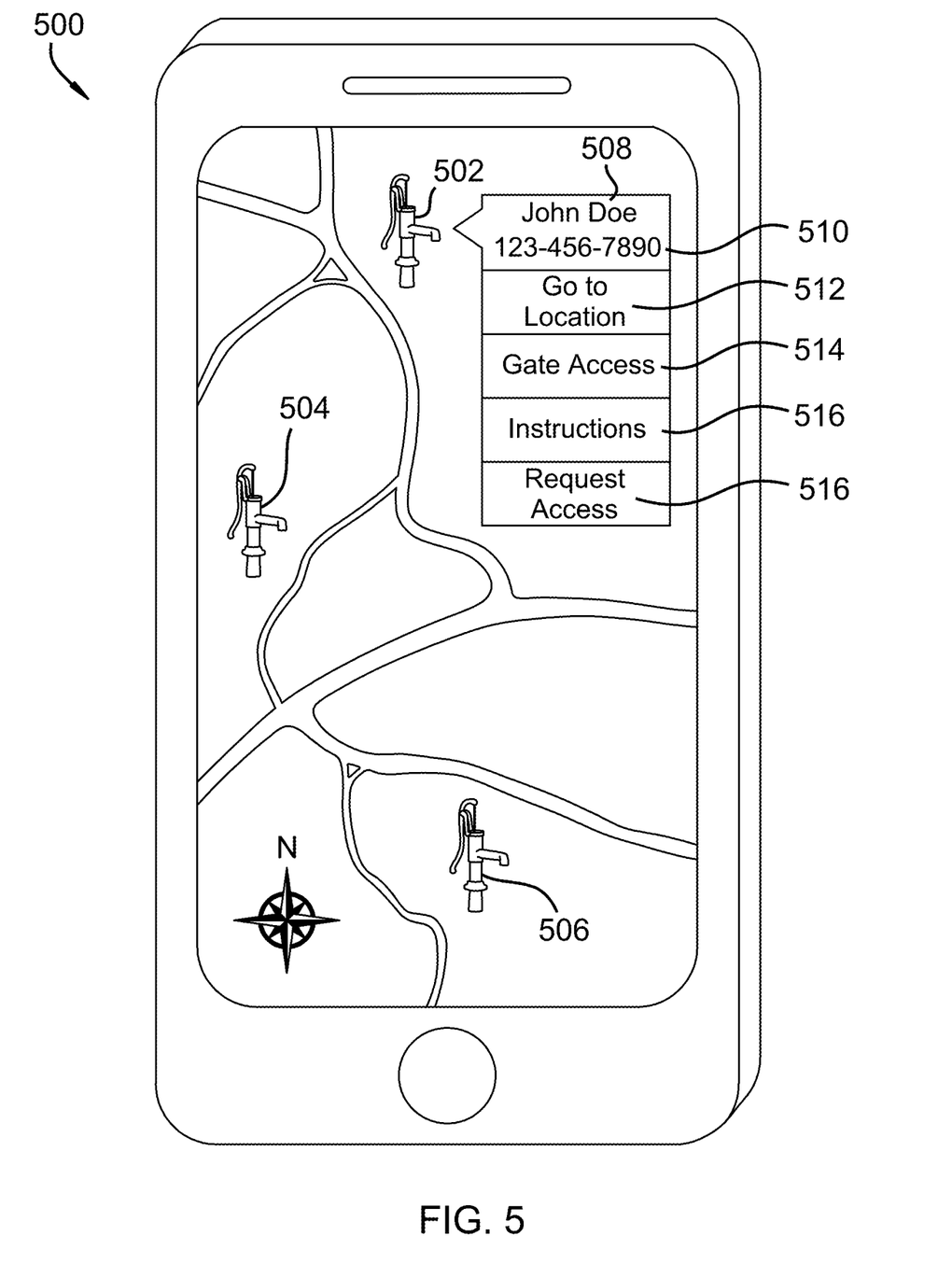
FIG. 5 is a front perspective view of a map device in accordance with an embodiment of the invention.

FIG. 5 shows water resource locations 502, 504, 506 on a second electronic device 500. If a user of second electronic device 500 wants to access water resource 502 the user can click on resource 502 to open a drop down window allowing the user to obtain contact information 510 on the resource owner 508. Other option may include: go to location 512, gate access 514, instructions on how to get to the water resource or how to get permission to use the water resource 516, and a request access button 516. Go to location button 512 may open a map navigator that leads the user directly to the water resource using stored online database coordinates for the water resource. Gate access may include gate codes for accessing the water resource and private roads leading to the water resource. Instructions may include video instructions, audio instructions, still image instructions, etc. Request access 516 may directly text an owner and request access or open an in app communication modules in both the owners phone and the resource requestors phone allowing permissions to be granted or denied.

Figure 6:
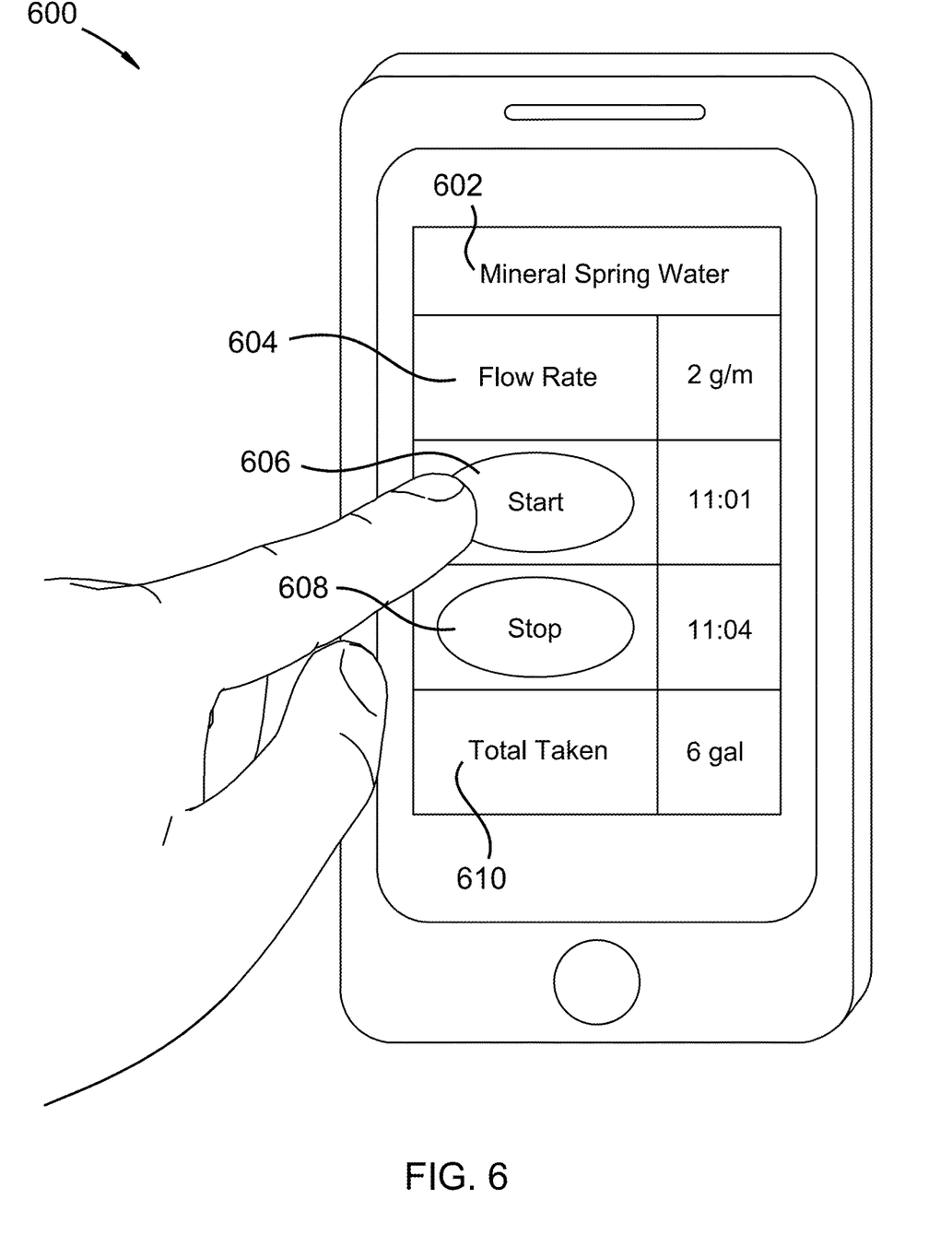
FIG. 6 is a front perspective view of a flow rate device in accordance with an embodiment of the invention.

FIG. 6 shows a communication device with a flow timer for calculation of water use at a water resource. Flow timer 600 may include a type of water 602, a flow rate 604, a start 606 and stop 608 button, and an amount of water taken 610. All fields may be stored in an online database for reporting to an owner an amount of water used by a specific user at a specific date and time.

Figure 7:
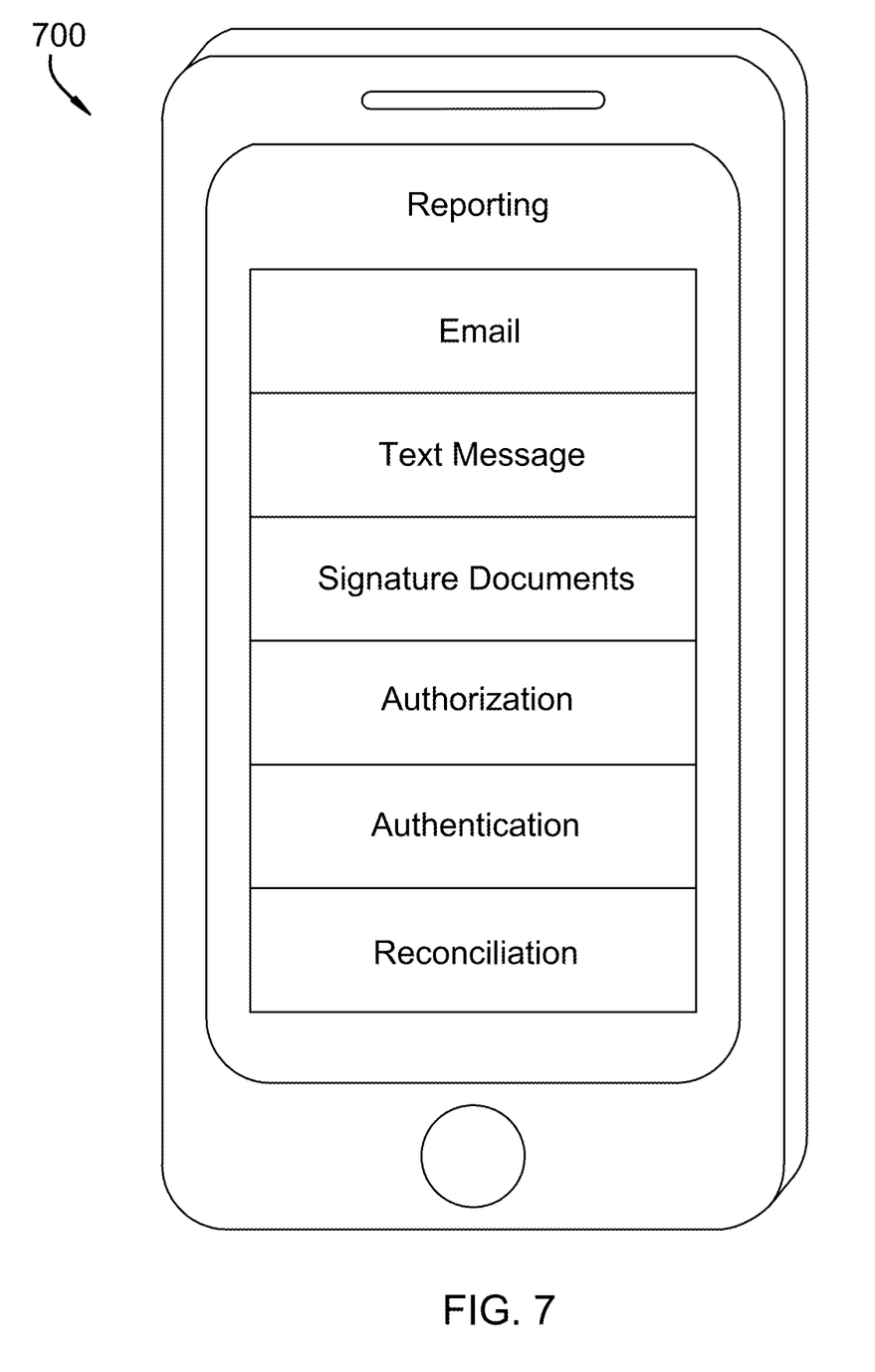
FIG. 7 is a front perspective view of a reporting device in accordance with an embodiment of the invention.

FIG. 7 shows a reporting module 700 of a software application in accordance with an embodiment of the invention. Reporting may include email, text messaging, signature documents, authorization, authentication, and reconciliation. Reporting may be used to inform an owner of water resource usage. Usage reports may include names, dates, times, amounts, signed documents, passwords, and any deficiency of payments or water credits related to the water resource. In one embodiment, governmental credits/incentives may be given in the faun of income tax credits, property tax credits, or city tax credits for water resource usage by state, federal, county, or city jurisdictions. In another embodiment, tax credits/incentives may be used to incentivize water resource owners to register their water resources.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of registering and locating a water resource comprising:
   incentivizing an owner for registering the water resource;
   taking a first electronic device within a predetermined radius of the water resource;
   running a first non-transitory computer program product in a memory of the first electronic device that names the water resource, associates the owner of the water resource to the water resource, associates owner contact information with the water resource, and stores coordinate location data of the water resource, the owner of the water resource, and the owner contact information in an online database;
   loading, using a second electronic device running a second non-transitory computer program product running in a memory of the second electronic device, the coordinate location data of the water resource within an area of an electronic map displayed on the second electronic device;
   informing a user of the second electronic device, after selection of the water resource, the name of the owner of the water resource and the owner contact information of the water resource;
   navigating the user to the water resource using a navigational map displayed on the second electronic device;
   instructing the user how to find and access the water resource;
   wherein the instructing includes flow rate capacity of the water resource; and
   crediting the owner upon use of the water resource.

2. The method of claim 1, wherein the predetermined distance is between 1 inch and 100 feet.

3. The method of claim 2, wherein the first electronic device or the second electronic device is a smart phone, tablet, laptop, GPS (global positioning system) tracking device, GPS (global positioning system) locating device, or computer.

4. The method of claim 1 further comprising: authenticating the user of the second electronic device.

5. The method of claim 4 further comprising: assigning privileges to the user of the second electronic device based on the authenticating.

6. The method of claim 1, wherein the instructing includes access codes to one or more gates enclosing the water resource.

7. The method of claim 1, wherein the instructing includes instructions of how to turn ON and OFF the water resource.

8. The method of claim 1, wherein the instructing includes restrictions of use of the water resource.

9. The method of claim 1, wherein the instructing includes one or more of: text information, video information, pre-recorded information, picture information, messaging information, or a combination thereof.

10. The method of claim 1, wherein the instructing includes access connection type of the water resource.

11. The method of claim 1 further comprising: allowing the user of the second electronic device to input an amount of water taken from the water resource.

12. The method of claim 1 further comprising: a start and stop timer of the second electronic device tracks time of water usage of the water resource.

13. The method of claim 12, wherein an amount of water taken is based on the time of water usage timer.

14. The method of claim 1 further comprising a reporting system for reporting activities associated with the water resource.

15. The method of claim 14, wherein the activities include one or more of: emailing, texting, authorizing, authenticating, or reconciling use of the water resource.

16. The method of claim 15, wherein the activities include notifying the owner of use or desired use of the water resource.

17. The method of claim 16, wherein the notifying of the owner includes soliciting authorization of the owner to use the water resource.

* * * * *